(12) United States Patent
Onishi et al.

(10) Patent No.: US 10,158,706 B2
(45) Date of Patent: Dec. 18, 2018

(54) COMMUNICATION METHOD FOR DATA SHARING SYSTEM, DATA SHARING SYSTEM, AND COMMUNICATION NODE

(71) Applicant: TOYOTA JIDOSHA KABUSHIKI KAISHA, Toyota-shi, Aichi (JP)

(72) Inventors: Ryokichi Onishi, Tokyo (JP); Toshihiko Watanabe, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 14/909,809

(22) PCT Filed: Oct. 27, 2014

(86) PCT No.: PCT/JP2014/005415
§ 371 (c)(1),
(2) Date: Feb. 3, 2016

(87) PCT Pub. No.: WO2015/079620
PCT Pub. Date: Jun. 4, 2015

(65) Prior Publication Data
US 2016/0261686 A1    Sep. 8, 2016

(30) Foreign Application Priority Data

Nov. 28, 2013 (JP) ................................. 2013-245966

(51) Int. Cl.
*G06F 15/16* (2006.01)
*H04L 29/08* (2006.01)
(Continued)

(52) U.S. Cl.
CPC ........ *H04L 67/104* (2013.01); *H04L 63/0442* (2013.01); *H04L 67/06* (2013.01); *H04L 67/141* (2013.01); *H04W 48/18* (2013.01)

(58) Field of Classification Search
CPC . H04L 2209/38; H04L 2209/56; H04L 9/085; H04L 9/3236; H04L 9/3255; H04L 9/3265; H04L 9/3297
(Continued)

(56) References Cited

U.S. PATENT DOCUMENTS

| 9,436,558 | B1 * | 9/2016 | Per ....................... G06F 11/1451 |
| 2002/0013898 | A1 * | 1/2002 | Sudia ....................... G06Q 20/02 |
| | | | 713/155 |

(Continued)

FOREIGN PATENT DOCUMENTS

| JP | 2006-184953 A | 7/2006 |
| JP | 2008-305371 A | 12/2008 |

OTHER PUBLICATIONS

Amin Vandat et al. "Epidemic Routing for Partially-Connected Ad Hoc Networks." Technical Report CS-200006, Duke University, 2000. 14 pages.

(Continued)

*Primary Examiner* — Farzana B Huq
(74) *Attorney, Agent, or Firm* — Oliff PLC

(57) ABSTRACT

A communication method for a data sharing system which is constituted by a plurality of communication nodes, and through which data transmitted from a transmission source node are propagated by having the respective communication nodes repeatedly transmit the data, includes: a transmission step in which a first communication node transmits a transmission stop message including a hash value of data in relation to which repeated transmission is to be stopped; a reception step in which a second communication node receives the transmission stop message; and a stopping step in which the second communication node stops transmission of data having an identical hash value to the hash value included in the transmission stop message. The hash value is preferably encrypted using a public key cryptosystem. A (Continued)

transmission source node of the transmission stop message may be a transmission source node or a destination node of the data to be stopped, or another node.

21 Claims, 12 Drawing Sheets

(51) Int. Cl.
*H04W 48/18* (2009.01)
*H04L 29/06* (2006.01)

(58) Field of Classification Search
USPC ....... 713/150, 155, 168, 175, 176, 182, 189, 713/193; 726/3, 26, 29; 709/203, 223, 709/227, 228, 237
See application file for complete search history.

(56) References Cited

U.S. PATENT DOCUMENTS

| | | | |
|---|---|---|---|
| 2003/0120647 A1* | 6/2003 | Aiken | G06F 17/30628 |
| 2007/0041583 A1* | 2/2007 | Boneh | H04L 9/0847 |
| | | | 380/28 |
| 2012/0096564 A1* | 4/2012 | Li | G06F 21/64 |
| | | | 726/26 |
| 2012/0233326 A1 | 9/2012 | Shaffer et al. | |
| 2015/0169671 A1* | 6/2015 | Pittelko | G06F 11/1448 |
| | | | 707/690 |

OTHER PUBLICATIONS

Yi Qian et al. "Performance Evaluation of a Secure MAC Protocol for Vehicular Networks." Military Communications Conference, 2008. MILCOM 2008. IEEE. pp. 1-6.

\* cited by examiner

FIG. 5A

405 — GENERAL DATA STORAGE UNIT

| 501 | 502 | 503 | 504 | 505 |
|---|---|---|---|---|
| TRANSMISSION SOURCE NODE ID | DESTINATION NODE ID | HASH VALUE OF DATA | DATA ATTRIBUTES | BODY OF DATA |

FIG. 5B

406 — PUBLIC KEY STORAGE UNIT

| 511 | 512 | 513 | 514 | 515 |
|---|---|---|---|---|
| NODE ID | PUBLIC KEY | GENERATION TIME/DATE | DEPLOYMENT CONDITION | MANAGEMENT NODE FLAG |

FIG. 5C

407 — TRANSMISSION STOP MESSAGE STORAGE UNIT

| 521 | 522 | 523 | 524 | 525 |
|---|---|---|---|---|
| GENERATION NODE ID | ENCRYPTED HASH VALUE | GENERATION TIME/DATE | DEPLOYMENT CONDITION | HASH VALUE OF DATA |

GENERAL DATA PACKET

TRANSMISSION STOP MESSAGE PACKET

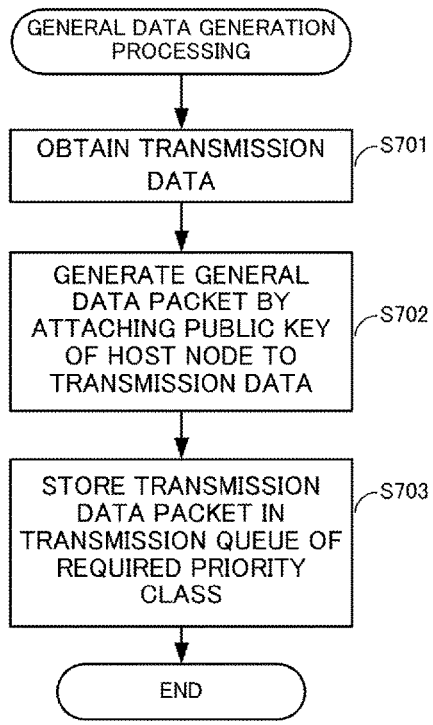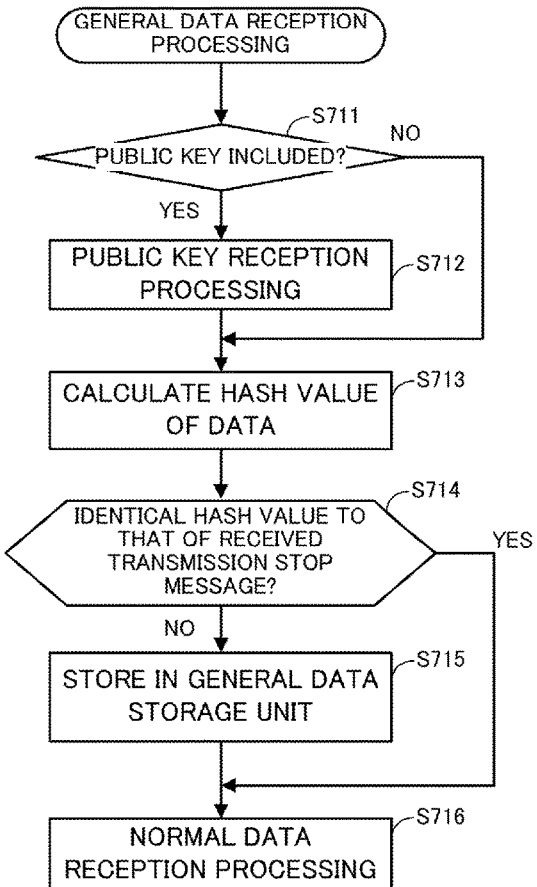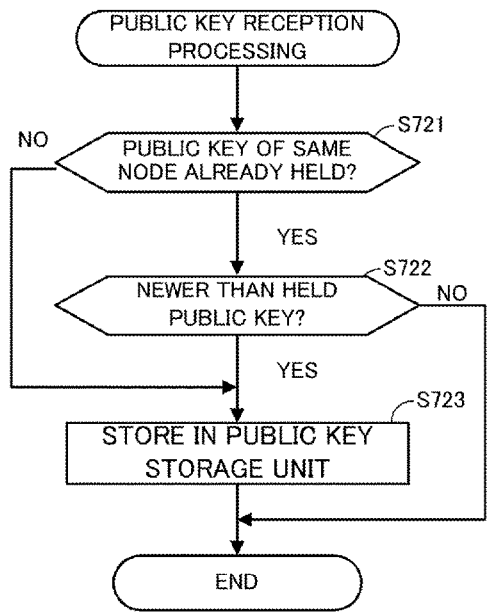

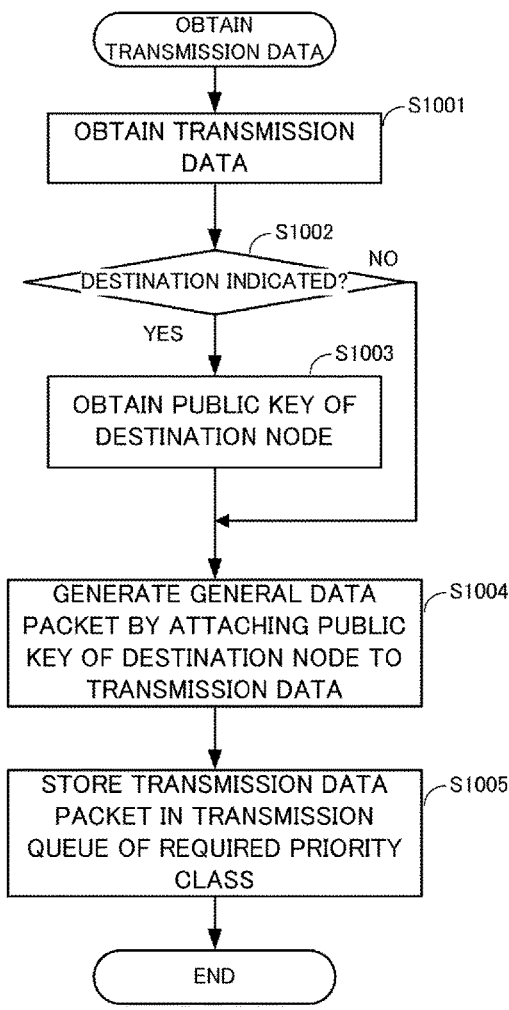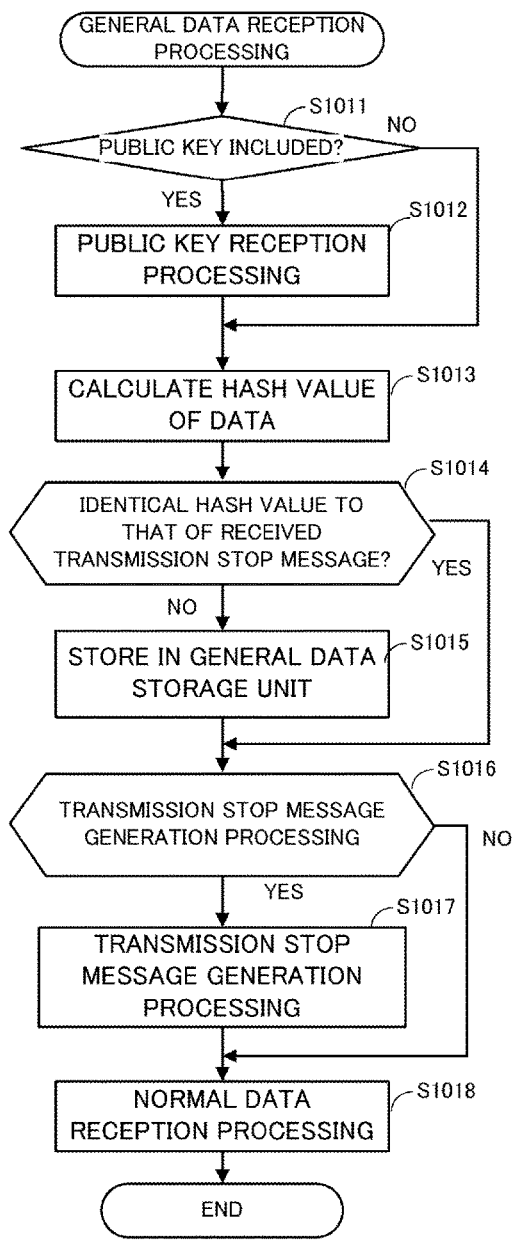

COMMUNICATION METHOD FOR DATA SHARING SYSTEM, DATA SHARING SYSTEM, AND COMMUNICATION NODE

TECHNICAL FIELD

The present invention relates to a communication method employed in a data sharing system, and more particularly to a technique for stopping data transmission in a data sharing system through which data are propagated by having respective communication nodes repeatedly transmit received data.

BACKGROUND ART

Research and development are being undertaken in relation to data sharing systems for diffusing/sharing data among a plurality of communication nodes (see NPL 1, for example). Data transmitted from a certain communication node are received by a peripheral communication node, and the reception node transmits the received data repeatedly at periodic intervals. As a result, the data can be propagated through the system. In a system where the communication nodes are mobile, such as a vehicle-to-vehicle network, the communication nodes transmit the data repeatedly while moving, and therefore the data can be propagated over a wider range.

In this type of data sharing system, it is desirable to be able to transmit transmission of data that are no longer required efficiently. PTL 1 proposes implementing an illegality check or the like using a central server to eliminate distribution of illegal content on a peer-to-peer (P2P) network. Further, PTL 2 proposes setting access rights in order to limit a data sharing range when information is uploaded to a P2P network, and also mentions stopping data distribution and data deletion following transmission.

CITATION LIST

Patent Literature

[PTL 1] Japanese Patent Application Publication No. 2008-305371
[PTL 2] Japanese Patent Application Publication No. 2006-184953

Non Patent Literature

[NPL 1] Amin Vahdat and David Becker, "Epidemic Routing for Partially-Connected Ad-Hoc Networks", Technical Report CS-200006, Duke University, 2000

SUMMARY OF INVENTION

The method described in PTL 1 envisages management by a centralized server capable of understanding the entire system, and cannot therefore be applied to a data sharing system in which such a management server does not exist. PTL 2 mentions stopping data distribution and deleting the data following data transmission, but does not disclose specific methods thereof.

An object of the present invention is to provide a technique employed in a data sharing system through which data are propagated by repeatedly transmitting received data to stop transmission (distribution) of transmitted data even when a central server does not exist.

The present invention is a communication method for a data sharing system which is constituted by a plurality of communication nodes and through which data transmitted from a transmission source node are propagated by having the respective communication nodes repeatedly transmit the data, including: a transmission step in which a first communication node transmits a transmission stop message including a hash value of data in relation to which repeated transmission is to be stopped; a reception step in which a second communication node receives the transmission stop message; and a stopping step in which the second communication node stops transmitting data having an identical hash value to the hash value included in the received transmission stop message.

As a result, distribution of the data transmitted through the data sharing system can be stopped.

Further, in the present invention, the second communication node preferably repeatedly transmits the transmission stop message received in the reception step. At this time, the transmission stop message is preferably transmitted with a higher degree of priority than normal data.

As a result, the transmission stop message can be propagated through the data sharing system so that transmission of the data can be stopped quickly.

Following reception of the transmission stop message, two cases may be envisaged, namely a case in which transmission of data received before the transmission stop message is stopped and a case in which transmission of data received after the transmission stop message is stopped. To realize the former case, the second communication node may store data transmitted from another communication node as data to be transmitted repeatedly, and in the stopping step, the second communication node may exclude data having an identical hash value to the hash value included in the transmission stop message from the data to be transmitted repeatedly. To realize the latter case, when the second communication node receives data transmitted from another communication node and a hash value of the data is not identical to the hash value included in the previously received transmission stop message, the second communication node may store the data as data to be transmitted repeatedly. When the hash values are identical, the data need not be stored as data to be transmitted repeatedly.

To store the data as data to be transmitted repeatedly, the data may be stored in a database (a table) that stores only data to be subjected to repeated transmission, for example. Alternatively, all received data may be stored in the same database, and at that time, a transmission requirement flag may be raised and stored together with the data to be subjected to repeated transmission. To exclude data from the data to be transmitted repeatedly, the data may be deleted from the database storing only data to be subjected to repeated transmission, or the transmission requirement flag may be switched OFF. Note that as long as the data to be subjected to a transmission stoppage are no longer transmitted repeatedly, the data may be either held in the communication node or deleted.

The hash value included in the transmission stop message is preferably encrypted using a public key cryptographic system. More specifically, in the transmission step, the first communication node preferably encrypts the hash value of the data in relation to which repeated transmission is to be stopped using a private key of the first communication node and transmits the transmission stop message after including the encrypted hash value therein, and in the stopping step, the second communication node preferably obtains the hash value of the data in relation to which repeated transmission is to be stopped by decoding the encrypted hash value included in the transmission stop message using a public key of the first communication node. A specific cryptographic algorithm of the public key cryptographic system may be selected as desired. Further, there are no particular limitations on a public key distribution method, and the public key may be distributed using a public key infrastructure (PKI) or another method.

As a result, transmission of a transmission stop message by an unauthorized communication node impersonating an authorized communication node can be detected.

In the present invention, the first communication node may be the transmission source node. In this case, when the data are to be transmitted, the first communication node may transmit the data after including the public key of the first communication node therein. As a result, when the data to be transmitted are incorrect or transmission thereof is no longer required, the transmission source node can stop distribution of the data. Further, by transmitting the public key together with the data, the node that receives the data (the data to be subjected to the transmission stoppage) from the first communication node can reliably obtain the public key of the first communication node and decrypt the transmission stop message.

Furthermore, in the present invention, the first communication node may be a destination node of the data. In this case, the transmission source node preferably obtains the public key of the first communication node (the destination node) in advance before transmitting the data, and when the data are to be transmitted, the transmission source node preferably transmits the data after including the public key of the first communication node therein. Further, the first communication node preferably transmits a transmission stop message requesting that repeated transmission of the data transmitted from the transmission source node be stopped at a timing at which the data are received. As a result, when data are transmitted from the transmission source node to the destination node and after the destination node receives the data, further transmission of the data through the system is no longer required, distribution of the data can be stopped. Moreover, the transmission source node transmits the data together with the public key of the first communication node, and therefore the node that receives the data (the data to be subjected to the transmission stoppage) from the transmission source node can reliably receive the public key of the destination node.

Furthermore, in the present invention, the first communication node may be a management node having a right to request stoppage of repeated transmission. In this case, the public key of the first communication node is preferably distributed to the other communication node in advance. Note that here, the management node is a node having the right to request that repeated transmission be stopped, and not a special communication node that performs a central role within the system.

Examples of communication nodes for transmitting the transmission stop message and public key distribution methods were described above, but in the present invention, a desired method other than those described above may be employed. In particular, various amendments may be implemented in relation to public key distribution. For example, the public key may be stored in a storage unit when the communication node is shipped, transmitted together with the transmission stop message, transmitted together with the data, or transmitted using another method.

Note that the present invention may also be regarded as a communication method for executing at least a part of the processing described above. The present invention may be regarded as a data sharing system or a communication node (a communication device) having means for executing at least a part of the processing described above. Moreover, the present invention may be regarded as a computer program for causing a computer to execute this method, or a computer-readable storage medium that stores this computer program non-temporarily. The present invention may also be constituted by any possible combinations of the respective means and processes described above.

According to the present invention, in a data sharing system through which data are propagated by repeatedly transmitting received data, transmission (distribution) of transmitted data can be stopped even when a central server does not exist.

BRIEF DESCRIPTION OF DRAWINGS

FIGS. 5A, 5B, and 5C are views showing respective table structures of a general data storage unit, a public key storage unit, and a transmission stop message storage unit according to the first embodiment.

FIGS. 7A, 7B, and 7C are flowcharts showing respective flows of general data generation processing, general data reception processing, and public key reception processing according to the first embodiment.

FIGS. 10A and 10B are flowcharts showing respective flows of transmission data generation processing and general data reception processing according to the second embodiment.

DESCRIPTION OF EMBODIMENTS

<Overview>

Figure 1:
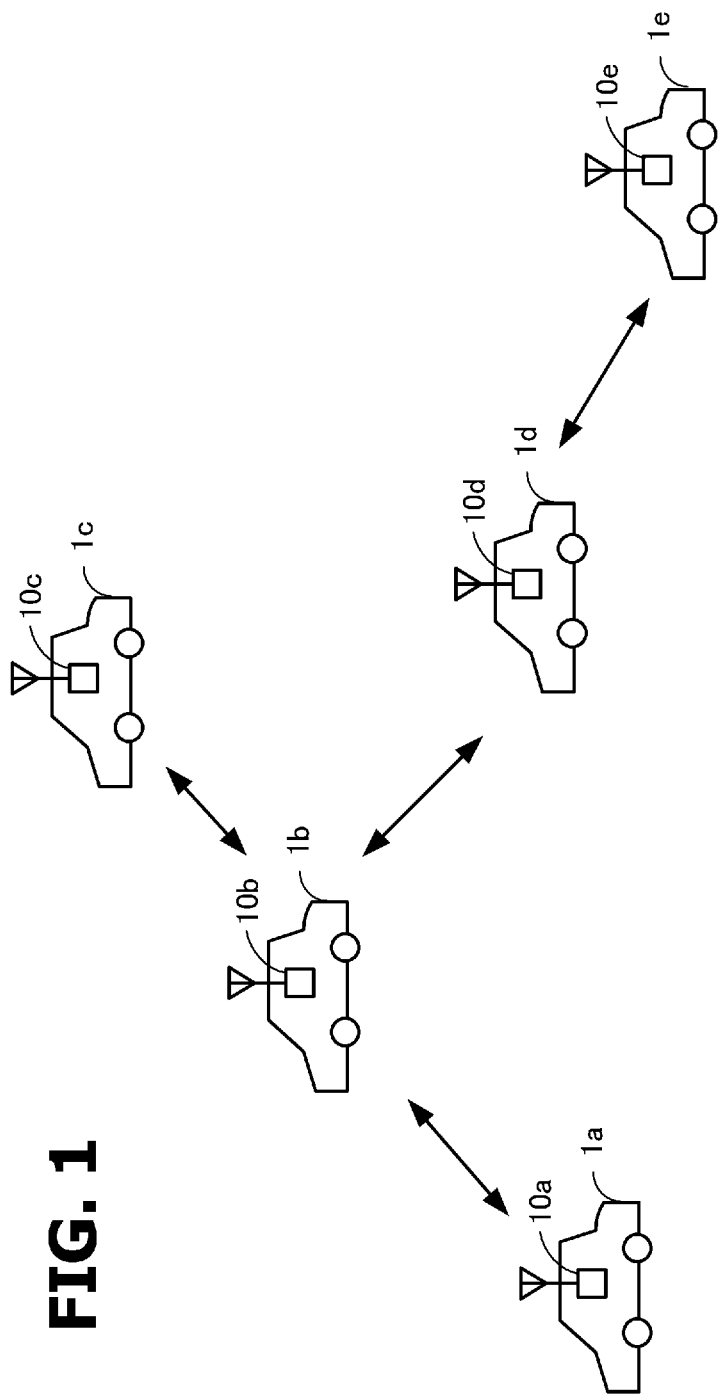
FIG. 1 is a schematic view showing a vehicle-to-vehicle wireless communication system (a data sharing system) according to an embodiment.

As shown in FIG. 1, an embodiment of the present invention is a vehicle-to-vehicle wireless communication system (a data sharing system) constituted by vehicles having an in-vehicle wireless communication device (an in-vehicle terminal), in which data sharing is performed through wireless communication between the in-vehicle terminals. In the drawing, a system constituted by five vehicles 1a to 1e respectively having in-vehicle terminals 10a to 10e is shown, but the number of vehicles may be set as desired. Note that in the following description, when there is no need to differentiate between the individual vehicles and in-vehicle terminals, these will simply be referred to as the vehicle 1 and the in-vehicle terminal 10.

Data transmitted from the vehicle 1 (the in-vehicle terminal 10) are received by another vehicle within a wireless communication range. After receiving data from another vehicle, the vehicle 1 transmits the data repeatedly at periodic intervals. As a result, data transmitted from a certain vehicle 1 are diffused widely through the system. For example, data transmitted from the vehicle 1a propagate from the vehicle 1b to the vehicle 1c, and from the vehicle 1b to the vehicle 1d and the vehicle 1e. Furthermore, the respective vehicles themselves move such that the data are transmitted in movement destinations, and therefore the data can be diffused over a geographically wide range.

Here, data transmitted into the system are transmitted repeatedly thereafter by peripheral vehicles. This embodiment provides a function for stopping data transmission through the system when necessary. Note that data transmission may also be limited by including a time range or a geographical range in which repeated transmission is to be performed in the transmission data, but according to this embodiment, data transmission can be stopped at an unintended timing during transmission.

Figure 2:
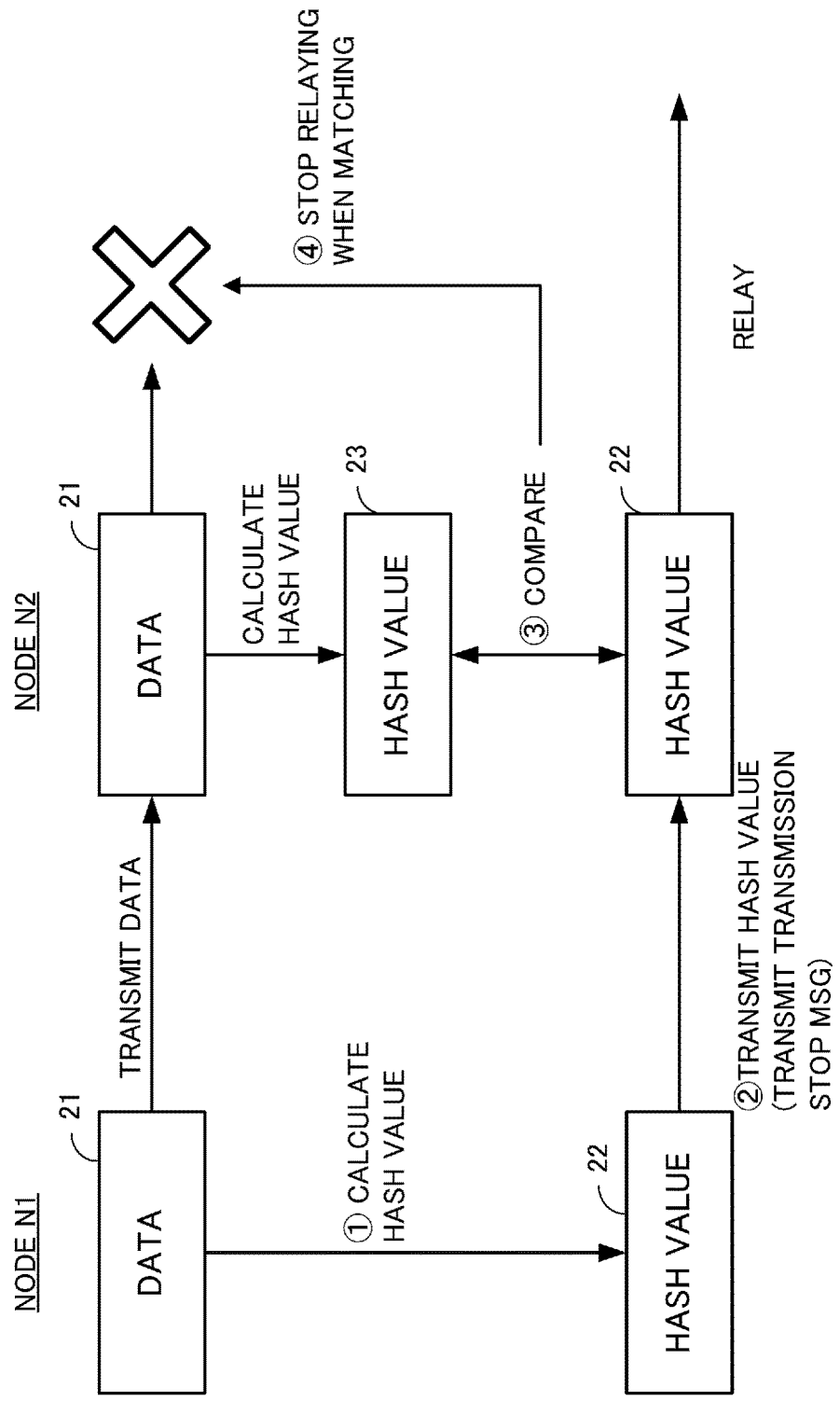
FIG. 2 is a schematic view illustrating a data transmission stopping method employed in the data sharing system.

FIG. 2 is a view illustrating an outline of a manner in which data transmission is stopped. As shown in the drawing, data 21 transmitted from a node N1 are received by a node N2 and then transmitted from the node N2 so as to diffuse through the system. The node N1 calculates a hash value 22 of the data 21, creates a transmission stop message (a transmission stop command) including the hash value 22, and transmits the transmission stop message to a peripheral node. The transmission stop message is likewise transmitted (relayed) further by the reception node so as to diffuse through the system. The node that receives the transmission stop message calculates a hash value 23 of data 21 received from another communication node, and when the hash value 23 is identical to the hash value 22 included in the transmission stop message, stops transmission of the data 21. In so doing, data transmission through the system can be stopped.

Note that although FIG. 2 only shows a case in which the node N2 receives data directly from the node N1, it is assumed to be self-evident that data transmission can be stopped similarly in a node that receives data from the node N1 via a relay. Further, in FIG. 2, the transmission source node of the data 21 generates and transmits the transmission stop message, but the node that generates the transmission stop message may be another node.

In the example shown in FIG. 2, the transmission stop message can be generated and transmitted by any node in relation to any data, and therefore a malicious node is able to hinder data distribution. In the following embodiments, examples in which security is achieved by ensuring that only a node which is authorized to stop transmission can stop transmission of the data will be described.

First Embodiment (Overview)

A first embodiment is an example in which the transmission source node of the transmission stop message is the transmission source node of the data to be stopped. When, for example, data are transmitted and then further transmission of the data becomes unnecessary, the content of the transmitted data is incorrect, and so on, a transmission stop message for stopping distribution of the data is transmitted by the transmission source node. Note that hereafter, data other than control data such as the transmission stop message will be referred to as general data.

Figure 3:
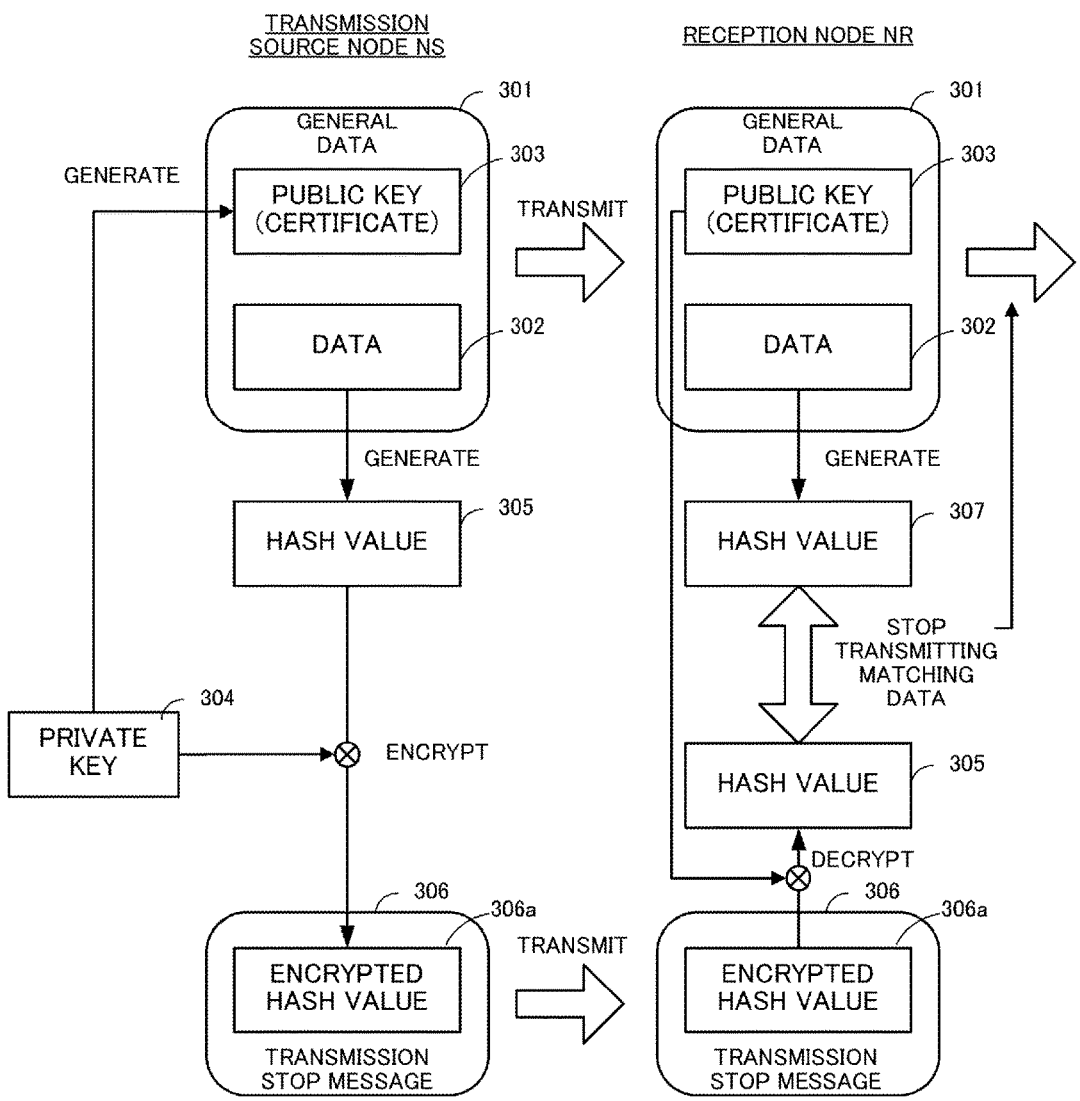
FIG. 3 is a view illustrating a data transmission stopping method according to a first embodiment.

An outline of a transmission stopping method according to this embodiment will now be described with reference to FIG. 3. A transmission source node NS transmits general data 301 after including a data body 302 and its own public key 303 therein. The public key 303 is a cryptographic key corresponding to a private key 304 of the transmission source node NS. The general data 301 generated by the transmission source node NS are received by a peripheral node NR and then transmitted repeatedly.

Here, when the transmission source node wishes to stop distributing the general data 301 through the system, the transmission source node generates and transmits a transmission stop message 306. The transmission stop message 306 includes an encrypted hash value 306a that is obtained by encrypting a hash value 305 calculated from the data body 302 of the general data 301 using the private key 304 of the transmission source node NS. The node NR, upon reception of the transmission stop message 306, obtains the hash value (plaintext) 305 of the general data to be subjected to the transmission stoppage by decoding the encrypted hash value 306a using the public key 303 of the transmission source node NS. The node NR then calculates a hash value 307 of general data received from another node, and when general data having an identical hash value to the hash value 305 obtained from the transmission stop message exist, stops further transmission of those general data. Note that the node NR relays the received transmission stop message 306, and therefore the transmission stoppage can be realized in other nodes.

With this method, data transmission through the system can be stopped from the transmission source node of the general data. At this time, a signature generated using a public key cryptographic system is employed, and therefore a node other than the transmission source node can be prevented from stopping transmission of the general data. In other words, in a case where the transmission stop message is transmitted by an unauthorized third party, decoding cannot be performed correctly when the encrypted hash value is decrypted using the public key, and as a result, the identity theft can be detected.

Furthermore, in this method, the public key 303 is transmitted together with the general data 301. Therefore, when the node that receives the transmission stop message 306 has already received the general data 301 to be subjected to the transmission stoppage, it is possible to ensure that the node has already obtained the public key 303 for decoding the transmission stop message 306. Conversely, when the reception node NR has not yet received the general data 301 from the transmission source node NS upon reception of the transmission stop message 306, the reception node NR cannot decrypt the transmission stop message 306 because the public key has not yet been obtained. Since the reception node NR is not in possession of the general data to be subjected to the transmission stoppage, however, this does not pose a problem. To deal with a case in which the transmission stop message is received first, a determination may be made upon reception of the general data as to whether or not the hash value of the general data matches the hash value included in the previously received transmission stop message. Subsequent repeated transmission may then be stopped when the hash values match.

(Functional Configuration of In-Vehicle Terminal)

Figure 4:
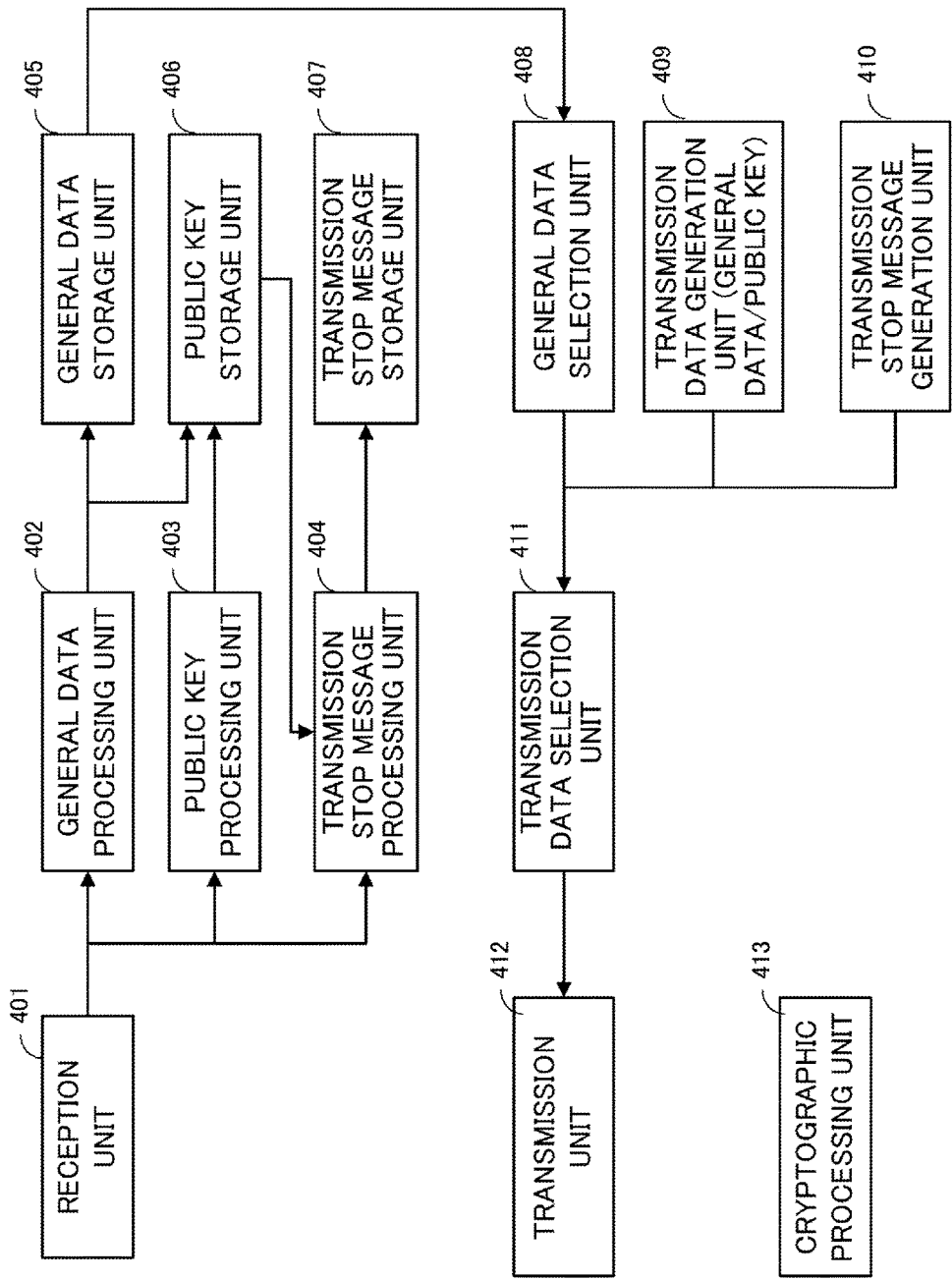
FIG. 4 is a block diagram showing a functional configuration of an in-vehicle terminal (a communication node).

FIG. 4 is a view showing a functional configuration of the in-vehicle terminal 10 installed in the vehicle 1. The in-vehicle terminal 10 is a computer having a wireless communication device. Various function units, such as those shown in FIG. 4, are realized by having a CPU read and execute a program stored in a physical, non-temporary storage device such as an HDD, an SDD, or a ROM. In other words, by having the CPU execute a computer program, the in-vehicle terminal 10 functions as, for example, a reception unit 401, a general data processing unit 402, a public key processing unit 403, a transmission stop message processing unit 404, a general data storage unit 405, a public key storage unit 406, a transmission stop message storage unit 407, a general data selection unit 408, a transmission data generation unit 409, a transmission stop message generation unit 410, a transmission data selection unit 411, a transmission unit 412, and a cryptographic processing unit 413. A part or all of these function units may be realized using dedicated hardware. Further, different function units may be realized using different computers, and one function unit may be realized using a plurality of computers.

The reception unit 401 and the transmission unit 412 are function units for performing wireless communication with another in-vehicle terminal 10. There are no particular limitations on a specific wireless communication system, and any desired system, such as a wireless LAN (IEEE 802.11 a/b/g/n/ac), Mobile WiMAX (IEEE 802.16e), iBurst or WAVE (IEEE 802.20), or DSRC (Dedicated Short Range Communications), may be employed. A cognitive radio using a white space may also be favorably employed.

The general data processing unit 402 is a function unit that processes general data (normal data other than a control message such as the transmission stop message) received from another communication node. More specifically, the general data processing unit 402 performs processing such as determining whether or not the received general data are the subject of a transmission stop message. Further, when the received general data include the public key of the transmission source node, the general data processing unit 402 transmits the general data to the public key processing unit 403. The public key processing unit 403 is a function unit that processes data relating to a public key received from another communication node. The transmission stop message processing unit 404 is a function unit that processes a transmission stop message received from another communication node. More specifically, the transmission stop message processing unit 404 performs processing to stop further transmission of general data for which a transmission stoppage is requested in the transmission stop message. The processing performed by these function units will be described in further detail below.

The general data storage unit 405 is a function unit that stores general data received from another communication node as data to be transmitted repeatedly. FIG. 5A shows a structure of the data stored in the general data storage unit 405. A transmission source node ID 501 is a node ID of the node that generated the received general node. A destination node ID 502 is an ID of the node serving as the destination of the general data. Note that in the case of data not having a specific destination, such as a broadcast message, the destination node ID 502 may be left blank. A data hash value 503 is the hash value of the data body of the received general data. The hash value may be calculated and stored in the storage unit at an appropriate timing, and before the hash value is calculated, the hash value 503 is left blank. Attributes of the general data other than those described above are stored in data attributes 504. For example, a time restriction (an expiration date) or a geographical restriction on transmission and so on may be included in the data attributes 504. A body portion of the received general data is stored in a data body 505. Note that here, a case in which only data to be transmitted repeatedly are stored in the general data storage unit 405 was described as an example, but instead, all received general data may be stored in the general data storage unit 405. In this case, a field for a transmission requirement flag indicating whether or not the general data require repeated transmission is preferably added.

The public key storage unit 406 is a function unit that stores a public key received from another communication node. FIG. 5B shows a structure of data stored in the public key storage unit 406. A node ID 511 is the node ID of the node corresponding to the received public key. A public key 512 is the received public key itself. A generation time/date 513 is a time/date on which the received public key was generated. A deployment condition 514 is a condition on which to distribute the received public key. For example, a time condition or a geographical condition relating to distribution may be included in the deployment condition 514. A management node flag 515 is a flag indicating whether or not the node corresponding to the received public key is a management node. The management node will be described below.

The transmission stop message storage unit 407 is a function unit that stores a transmission stop message received from another communication node. FIG. 5C shows a structure of data stored in the transmission stop message storage unit 407. A node ID 521 is the node ID of the node that generated the received transmission stop message. An encrypted hash value 522 is an encrypted hash value included in the transmission stop message. As will be described below, the transmission stop message includes an encrypted hash value obtained by encrypting the hash value of the data body to be subjected to the transmission stoppage using the private key of the transmission source node of the transmission stop message. The hash value in this encrypted condition is stored in the encrypted hash value 522. A hash value obtained by decoding the encrypted hash value included in the transmission stop message using the private key of the transmission source node of the transmission stop message is stored in a data hash value 525. The encrypted hash value may be decrypted at a desired timing, and before decoding is performed, the hash value 525 may be left blank.

The general data selection unit 408 repeatedly selects the general data stored in the general data storage unit 405 in accordance with a predetermined algorithm, and stores the selected general data in a transmission queue. Here, there are no particular limitations on the data selection algorithm. The data may be selected by setting a degree of priority on the basis of the generation time/date of the data, setting a degree of priority on the basis of a comparison between a generation position of the data and a current position of the host node, or at random. It is necessary, however, to ensure that the message for which a transmission stoppage has been requested in the transmission stop message is not selected. In this embodiment, only the general data to be transmitted repeatedly are stored in the general data storage unit 405, and therefore, as long as the data are selected from the general data storage unit 405, no special measures are required. When general data for which a transmission stoppage has been requested are also stored in the general data storage unit 405, however, general data in relation to which the transmission requirement flag has been switched ON may be selected.

Figure 6A:
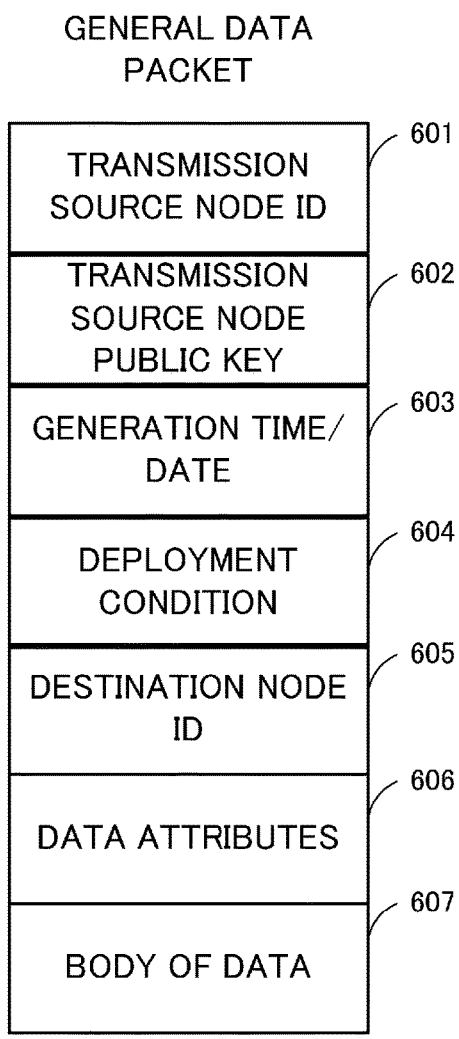
FIGS. 6A and 6B are views showing respective packet structures of a general data packet and a transmission stop message packet according to the first embodiment.

The transmission data generation unit 409 is a function unit that generates the general data to be transmitted by the host node serving as the transmission source node. Content of the general data to be transmitted may be set as desired. In this embodiment, the transmission data generation unit 409 includes the public key of the host node in the transmission data. FIG. 6A shows a structure of a general data packet generated by the transmission data generation unit 409. A transmission source node ID 601 is the node ID of the transmission source node. A transmission source node public key 602 is the public key of the host node (the transmission source node). A generation time/date 603 is the time/date on which the transmission data generation unit 409 generated the data. A deployment condition 604 is the condition on which to distribute the general data. A destination node ID 605 stores the node ID of the destination node when a destination is included in the general data. Data attributes 606 are desired attributes other than those described above. Content of a data body 607 may be set as desired. For example, information such as a current position and a speed of the vehicle may be set as the data body 607. The transmission data generation unit 409 stores the generated transmission data in a transmission queue.

Note that a mechanism by which the validity of the public key attached to the general data can be guaranteed is preferably introduced. For example, the public key may be sent in the form of a digital certificate in which a digital signature of a certification authority is appended to the public key. By storing a digital certificate from the certification authority in each in-vehicle terminal in advance, it is possible to determine whether or not the digital certificate (the public key) is valid on the basis of the digital certificate appended to the public key.

Figure 6B:
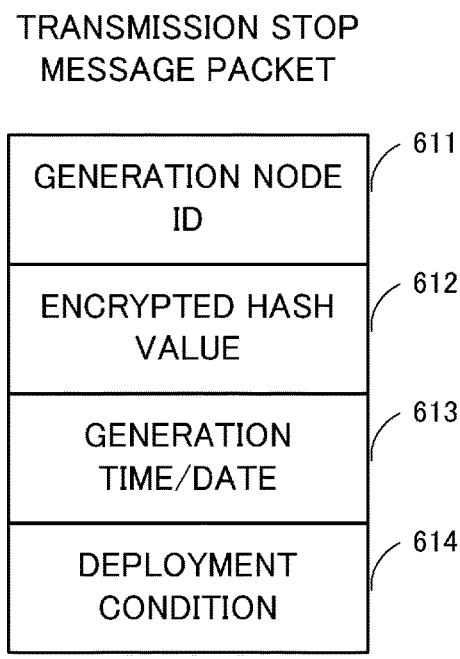

The transmission stop message generation unit 410 is a function unit (stop message transmitting means) that generates a transmission stop message including specification of general data to be subjected to the transmission stoppage when transmission of the general data through the system is to be stopped. An encrypted hash value obtained by encrypting the hash value of the general data to be stopped using the private key of the host node is used to specify the general data to be subjected to the transmission stoppage. FIG. 6B shows a packet structure of the transmission stop message generated by the transmission stop message generation unit 410. A generation node ID 611 is the node ID of the node that generated the transmission stop message, and the host node (i.e. the node ID of the node including the transmission stop message generation unit 410) is stored therein. An encrypted hash value 612 is a value obtained by encrypting the hash value of the general data body to be subjected to the transmission stoppage using the private key of the host node. A generation time/date 613 is the time/date on which the transmission stop message generation unit 410 generated the transmission stop message. A deployment condition 614 is the condition on which to distribute the transmission stop message. The transmission stop message generation unit 410 stores the generated transmission stop message in a transmission queue. Note that the transmission queue in which the transmission stop message is stored preferably has a higher degree of priority than the transmission queue storing the general data.

The transmission data selection unit 411 is a function unit that selects appropriate data from the data included in the transmission queue, and transmits the selected data via the transmission unit 412. The transmission data selection unit 411 selects and transmits data included in a transmission queue having a high degree of priority preferentially. Here, any existing method may be employed as priority control. For example, data may be transmitted in order from the data included in the transmission queue having the highest degree of priority, or data may be selected and transmitted from the respective transmission queues in proportions corresponding to degrees of priority.

The cryptographic processing unit 413 is a function unit that provides various types of cryptographic processing based on the public key cryptographic system. The cryptographic processing unit 413 has functions for generating a pair constituted by a public key and a private key, storing the private key safely, and providing the public key to the outside. The cryptographic processing unit 413 also has functions for receiving data and implementing cryptographic processing using the private key on the data, receiving data and a public key (which may be a public key other than that of the host node) and implementing cryptographic processing using the public key on the data, and receiving data and calculating the hash value of the data. Note that any desired public key cryptosystem, such as RSA cryptography, elliptic curve cryptography, or ElGamal cryptography, may be employed. Further, any desired hash value calculation system, such as SHA-256, may be employed.

(Processing Flow)

Processing implemented by the in-vehicle terminal according to this embodiment will be described below with reference to flowcharts. Note that the following flowcharts merely show examples of respective processes, and identical functions can be realized even after implementing various amendments. For example, although not specified clearly in the following description, it is assumed that persons skilled in the art will understand that implementation sequences of the respective processes may be switched, and several processes may be implemented in parallel.

1. General Data Generation Processing

First, processing performed by the transmission data generation unit 409 to generate the general data to be transmitted will be described with reference to a flowchart shown in FIG. 7A. The transmission data generation unit 409 obtains the content of the data to be transmitted by the host node as the transmission source node (S701). Thus, the general data packet shown in FIG. 6A is generated (S702). At this time, the transmission data generation unit 409 obtains the public key of the host node from the cryptographic processing unit 413, and includes the obtained public key in the general data packet. The transmission data generation unit 409 then stores the generated general data packet in a transmission queue of an appropriate priority class (S703).

2. General Data Reception Processing

Next, processing (general data reception processing) performed by the general data processing unit 402 on received general data will be described with reference to a flowchart shown in FIG. 7B. The general data processing unit 402 determines whether or not a public key is included in the received general data (S711), and when a public key is included (S711-YES), notifies the public key processing unit 403 thereof in order to cause the public key processing unit 403 to implement public key reception processing 712. The public key reception processing is shown in detail in FIG. 7C. When a public key from the same node is not held in the public key storage unit 406 (S721-NO), the public key processing unit 403 stores the received public key in the public key storage unit 406 (S723). Further, when a public key from the same node is held in the public key storage unit 406 (S721-YES) but the generation time/date of the received public key is newer than the generation time/date of the public key stored in the public key storage unit 406 (S722-YES), the public key processing unit 403 stores the received public key in the public key storage unit 406 (S723). When a public key from the same node is already held, an update may be performed by overwriting the held public key. Note that when the newer public key from the same node is already held (S721-YES and S722-NO), no particular processing is performed.

Returning to the description of the general data reception processing (FIG. 7B), the general data processing unit 402 calculates the hash value of the data body of the received general data using the cryptographic processing unit 413 (S713). A determination is then made as to whether or not the calculated hash value is identical to a hash value included in a transmission stop message that has already been received (S714). When the hash values are not identical (S714-NO), the general data processing unit 402 determines that the received general data are data to be transmitted repeatedly, and stores the data in the general data storage unit 405. At this time, the calculated hash value is stored together with the data. When the hash value of the received general data is identical to the hash value included in the received transmission stop message (S714-YES), the general data processing unit 402 determines that the received general data are not data to be transmitted repeatedly, and therefore does not store the data in the general data storage unit 405. Finally, the general data processing unit 402 implements other required processing on the received data (S716). Note that here, data not to be transmitted repeatedly are not stored in the general data storage unit 405, but instead, the transmission requirement flag may be switched ON or OFF in accordance with whether or not the data are to be transmitted repeatedly, in which case all of the received general data are stored in the general data storage unit 405.

3. Transmission Stop Message Generation Processing

Figure 8A:
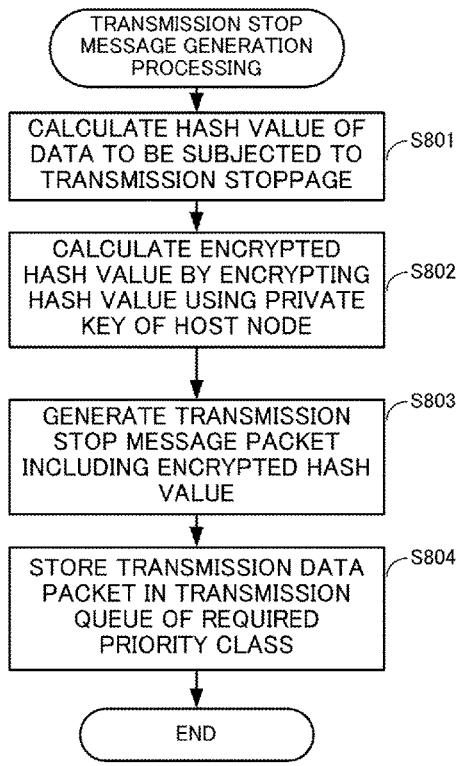
FIGS. 8A, 8B, and 8C are flowcharts showing respective flows of transmission stop message generation processing, transmission stop message reception processing, and general data selection processing according to the first embodiment.

Next, transmission stop message generation processing performed by the transmission stop message generation unit 410 will be described with reference to a flowchart shown in FIG. 8A. The transmission stop message generation unit 410 calculates the hash value of general data to be subjected to a transmission stoppage (S801). Here, the transmission source of the general data to be subjected to the transmission stoppage is the host node, and therefore the transmission stop message generation unit 410 must store the general data (or the hash value thereof) generated and transmitted by the host node in advance. The transmission stop message generation unit 410 issues a request to the cryptographic processing unit 413 to encrypt the calculated hash value using the private key of the host node, and obtains the encrypted hash value (S802). The transmission stop message generation unit 410 then generates a transmission stop message packet including the encrypted hash value (S803). The transmission stop message generation unit 410 stores the generated transmission stop message in a transmission queue of an appropriate priority class (S804).

4. Transmission Stop Message Reception Processing

Figure 8B:
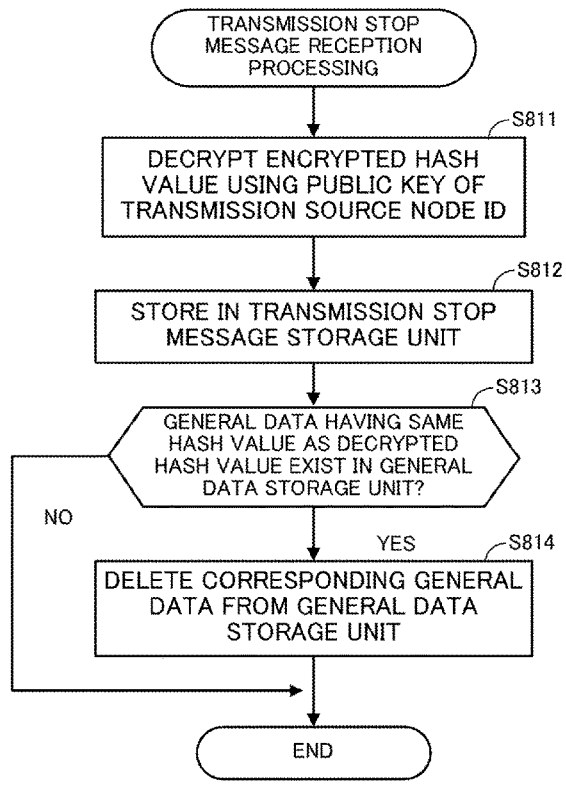

Next, processing (transmission stop message reception processing) performed by the transmission stop message processing unit 404 on the received transmission stop message will be described with reference to a flowchart shown in FIG. 8B. The transmission stop message processing unit 404 obtains the public key of the generation node of the received transmission stop message from the public key storage unit 406, and decrypts the encrypted hash value included in the transmission stop message using the public key. Further, the received transmission stop message is stored in the transmission stop message storage unit 407, and the decrypted hash value (plaintext) is stored at the same time (S802). The transmission stop message processing unit 404 then determines whether or not general data having an identical hash value to the hash value included in the received transmission stop message exist in the general data storage unit 405 (S813). This is preferably achieved by determining whether or not the transmission source node of the transmission stop message and the transmission source node of the general data to be subjected to the transmission stoppage are identical. In so doing, it can be guaranteed that the node requesting the transmission stoppage is the transmission source node of the general data. When it is determined in step S813 that general data having an identical hash value to the hash value included in the received transmission stop message exist in the general data storage unit 405 (S813-YES), the corresponding general data are deleted from the general data storage unit 405. Note that when the transmission requirement flag is employed in the general data storage unit 405, the transmission requirement flag may simply be switched OFF. Processing for deleting the general data from the general data storage unit 405 or switching the transmission requirement flag OFF corresponds to transmission stop processing for excluding data from the data to be transmitted repeatedly.

A case in which the public key of the transmission source node has not yet been received upon reception of the transmission stop message may be envisaged. In this case, the received transmission stop message may be stored in the transmission stop message storage unit 407 in a manner indicating that the transmission stop message requires decoding processing. Then, every time a public key is received from a new node, a determination may be made as to whether or not the transmission stop message requiring decoding processing was received from this node, and when the transmission stop message corresponds to the node, processing to calculate the encrypted hash value included in the transmission stop message, stop transmission of the corresponding data, and so on may be performed.

5. General Data Selection Processing

Figure 8C:
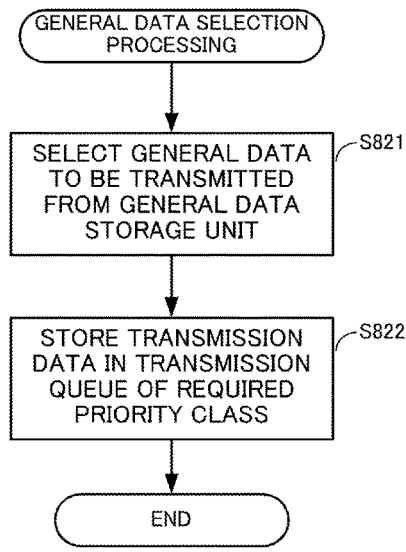

Next, general data selection processing performed by the general data selection unit 408 will be described with reference to a flowchart shown in FIG. 8C. This processing is performed repeatedly to transmit the selected general data peripherally. A repetition interval may be fixed or unfixed. In other words, repeated transmission may be performed periodically or non-periodically. The general data selection unit 408 selects one or a plurality of sets of general data from the general data stored in the general data storage unit 405 in accordance with a predetermined algorithm (S821). The general data to be transmitted repeatedly are stored in the general data storage unit 405, and therefore this processing may also be expressed as processing performed to select a predetermined number of sets of general data from the general data to be transmitted repeatedly in accordance with the predetermined algorithm. Any general data selection algorithm may be employed. Algorithms such as prioritizing general data having a recent reception time/date or a recent generation time/date, prioritizing general data having a nearby generation location, or prioritizing general data having an older most recent transmission time, for example, may be envisaged. In the present invention, there are no particular limitations on the data selection algorithm itself, and the general data may be selected in accordance with a reference other than those described above. Note that when the transmission requirement flag is employed, the general data may be selected from the data in relation to which the transmission requirement flag is switched ON. The general data selection unit 408 stores the selected data in a transmission queue of an appropriate priority class (S822).

(Advantageous Effects of This Embodiment)

According to this embodiment, in a data sharing system in which respective communication nodes repeatedly transmit data received thereby so that the data are diffused through the system, transmission of the data through the system can be stopped after the data have been transmitted. Further, a signature generated using a public key cryptosystem is employed, and therefore a node other than a node having appropriate authorization (in this embodiment, a node other than the transmission source node of the data) can be prevented from stopping transmission of the data. Furthermore, the public key of the host node is attached to the general data transmitted by the transmission source node, and therefore, when the node that receives the transmission stop message has already received the general data to be subjected to the transmission stoppage, it can be ensured that the node has already received the public key of the transmission source node. In other words, when the general data to be subjected to the transmission stoppage are held, transmission of the general data can be stopped by decoding the encrypted hash value included in the transmission stop message. Further, when the transmission stop message is received before the transmission subject general data, the encrypted hash value can be decrypted upon reception of the transmission subject general data, and therefore transmission of the general data to be stopped can likewise be stopped.

Second Embodiment

A second embodiment of the present invention is an example in which the transmission source of the transmission stop message is the destination node of the data to be stopped. For example, after the destination node receives data, there is no longer any need to transmit the data further through the system. Hence, by having the destination node of the data transmit the transmission stop message at a reception timing of the data, unnecessary data distribution can be prevented.

Figure 9:
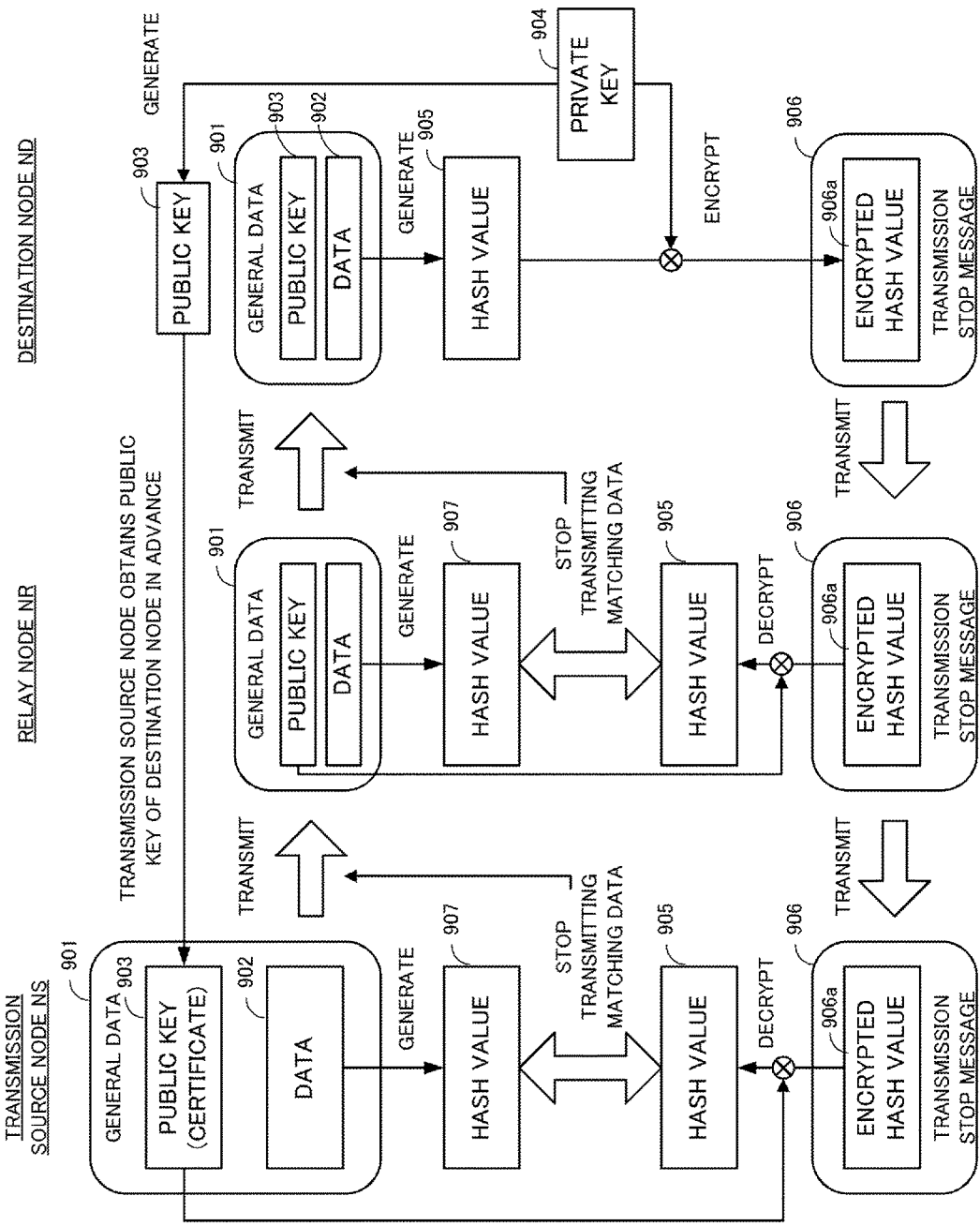
FIG. 9 is a view illustrating a data transmission stopping method according to a second embodiment.

An outline of a transmission stop method according to this embodiment will be described with reference to FIG. 9. Here, a case in which the transmission source node NS transmits data to a destination node ND serving as the destination is envisaged. The transmission source node NS transmits general data 901 including a data body 902 and a public key 903 of the destination node ND. The public key 903 is a cryptographic key corresponding to a private key 904 of the destination node ND, and the transmission source node NS obtains the public key 903 of the destination node ND in advance, before transmitting the general data. The general data 901 transmitted by the transmission source node NS are received by a peripheral node (a relay node) NR and then transmitted repeatedly. The general data 901 transmitted from the transmission source node NS arrive at the destination node ND after being relayed via one or a plurality of relay nodes NR.

The destination node ND, upon reception of the general data 901 destined for itself, generates and transmits a transmission stop message in order to stop transmission of the data. More specifically, a transmission stop message 906 is transmitted after calculating a hash value 905 of the data body 902 of the general data 901 and including an encrypted hash value 906a, which is obtained by encrypting the hash value 905 using the private key 904 of the host node, in the transmission stop message 906. The node that receives the transmission stop message 906 obtains the hash value (plaintext) 905 of the general data to be subjected to the transmission stoppage by decoding the encrypted hash value 906a using the public key 903 of the transmission source node of the transmission stop message 906 (i.e. the destination node ND of the general data 901 to be stopped). Then, when general data having an identical hash value to the hash value 905 included in the transmission stop message exist among previously received general data, further transmission of those general data is stopped. Note that the node that receives the transmission stop message 306 relays the message so that the transmission stoppage can be realized likewise in the other nodes.

Here, a case in which the general data to be subjected to the transmission stoppage are received first was described as an example, but transmission of the general data can be suppressed in a similar manner to the first embodiment likewise in a case where the transmission stop message is received first and the general data to be subjected to the transmission stoppage are received thereafter.

With this method, data transmission through the system can be stopped from the destination node of the general data. Hence, distribution of the data through the system can be stopped at a timing at which the destination node of the general data receives the data. The other effects realized by the first embodiment can also be realized similarly.

A hardware configuration and a functional configuration of the in-vehicle terminal are basically identical to the first embodiment, and therefore differences will mainly be described here.

In this embodiment, the processing performed by the transmission data generation unit 409 differs partially from the first embodiment. FIG. 10A is a flowchart showing transmission data generation processing according to this embodiment. The transmission data generation unit 409 obtains the content of the data to be transmitted by the host node as the transmission source node (S1001). The transmission data generation unit 409 then determines whether or not the general data to be transmitted are data including a destination node (S1002). When a specific destination does not exist, as in the case of a broadcast (S1002-NO), this means that the generated general data packet does not include a public key. When the data include a destination node (S1002-YES), on the other hand, this means that the generated general data packet includes a public key, and therefore the public key of the destination node is obtained (S1003). Any method may be used to obtain the public key of the destination node. For example, each node may notify peripheral nodes of its own public key repeatedly, or the transmission source node may request the public key from the destination node when generating the general data. Further, the transmission source node may obtain the public key from a repository, as in a PKI. Note that when the public key is transmitted to peripheral nodes, the transmission data generation unit 409 may generate and transmit a public key notification packet including the public key of the host node.

Processing of steps S1004 to S1005 is similar to the first embodiment (steps S702 to S703 in FIG. 7A), except that the public key belongs to the destination node.

Figure 11:
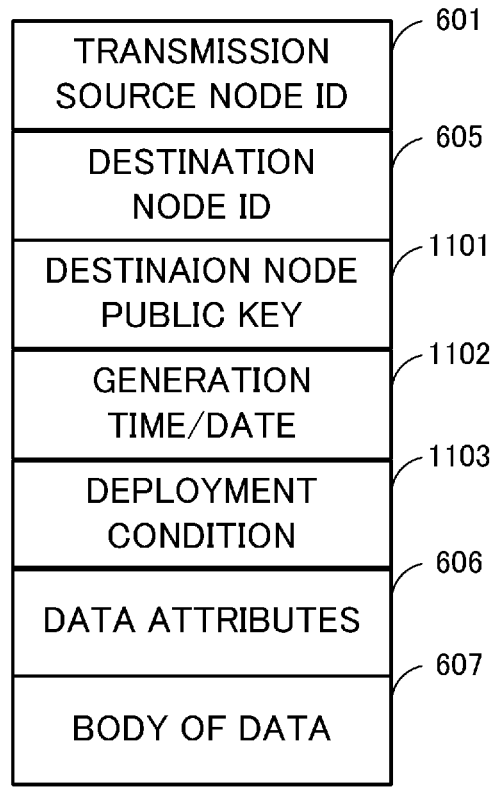
FIG. 11 is a view showing a structure of a general data packet according to the second embodiment.

FIG. 11 shows the structure of the general data packet generated by the transmission data generation unit 409. The general data packet is constituted by a transmission source node ID 601, a destination node ID 605, a destination node public key 1101, a generation time/date 1102 and a deployment condition 1103 of the public key, other attributes 606 of the general data, and a data body 607.

The general data reception processing performed by the general data processing unit 402 also differs partially from the first embodiment. The general data reception processing according to this embodiment will now be described with reference to a flowchart shown in FIG. 10B. Processing of steps S1011 to S1015 is similar to the first embodiment (steps S711 to S715 in FIG. 7B).

The general data processing unit 402 determines whether or not the destination of the received general data is the host node (S1016). When the destination of the received general data is the host node, the general data processing unit 402 notifies the transmission stop message generation unit 410 thereof to prompt the transmission stop message generation unit 410 to implement transmission stop message generation processing (S1017). Note that the transmission stop message generation processing itself is identical to the first embodiment.

Functions of the transmission stop message processing unit 404 are basically identical to the first embodiment. In this embodiment, however, the transmission source node of the transmission stop message is the destination node of the data to be stopped, and therefore, when the hash values are compared, it is confirmed that the destination node of the received general data and the transmission source node of the transmission stop message are identical. As a result, it can be ensured that the request for a transmission stoppage has been issued by the destination node of the general data.

According to this embodiment, transmission of data through the system can be stopped at a timing at which the destination node receives the data.

Third Embodiment

A third embodiment of the present invention is an example in which a special node (referred to hereafter as a management node) having the right to stop transmission of data through the system generates and transmits the transmission stop message. For example, the management node monitors the data distributed through the system, and when a bandwidth becomes limited, a specific node transmits a large amount of data, or the like, transmits a transmission stop message to stop distribution of the data through the system. Note that although the management node is typically a node other than the transmission source node or the destination node of the data to be stopped, the management node may be the transmission source node or the destination node of the data to be stopped.

Figure 12:
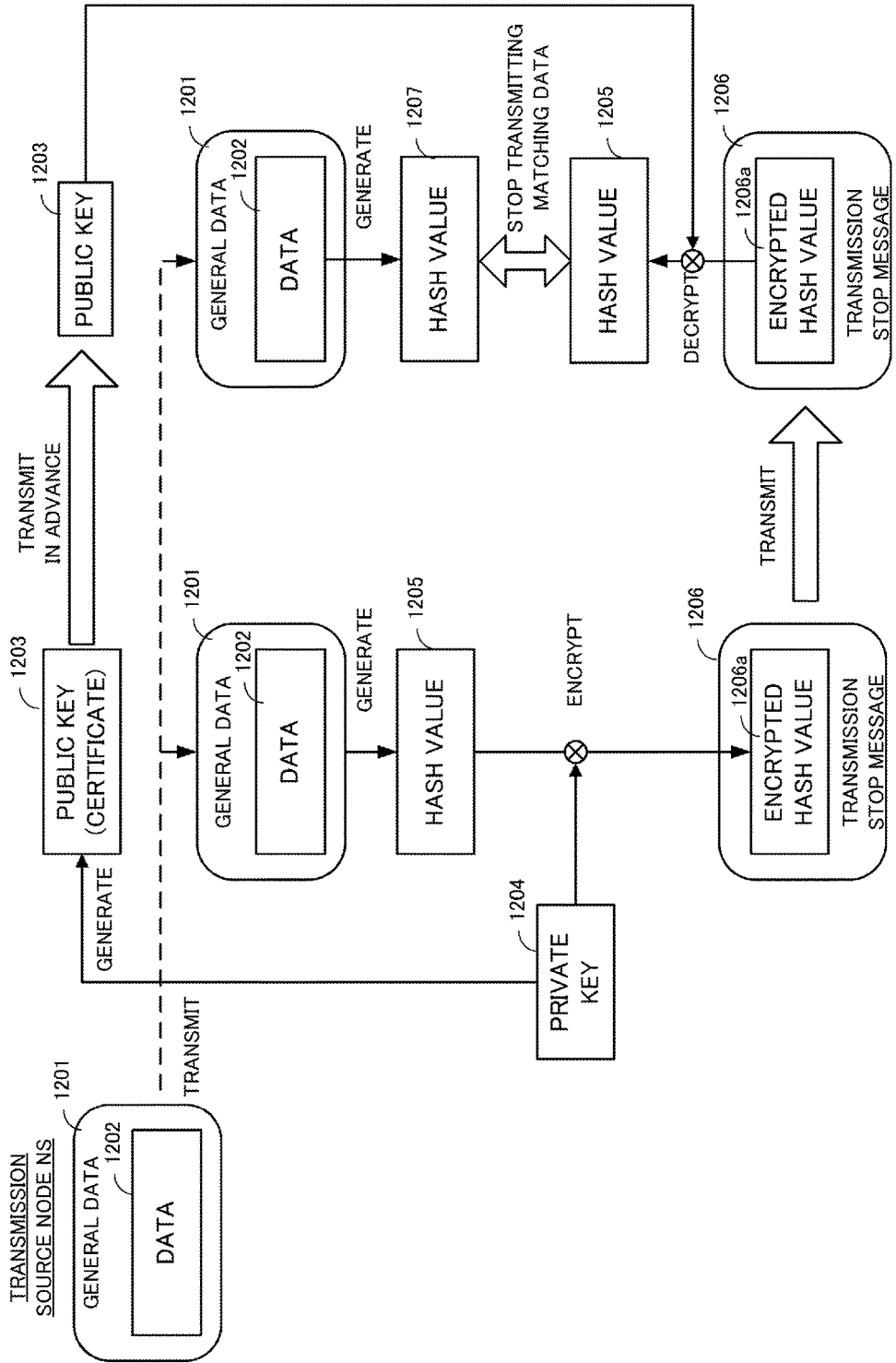
FIG. 12 is a view illustrating a data transmission stopping method according to a third embodiment.

An outline of a transmission stopping method according to this embodiment will now be described with reference to FIG. 12. In this embodiment, a management node NA holds a private key 1204, and a public key 1203 corresponding to the private key 1204 is distributed in advance to the other nodes. General data 1201 transmitted from the transmission source node NS is relayed through the system so as to be received by the management node NA and another reception node NR.

Here, when the management node NA wishes to stop transmitting the received general data 1201, the management node NA generates and transmits a transmission stop message for stopping transmission of the data. More specifically, the management node NA calculates a hash value 1205 of a data body 1202 of the general data 1201, includes an encrypted hash value 1206a obtained by encrypting the hash value 1205 using its own private key 1204 in a transmission stop message 1206, and then transmits the transmission stop message 1206. The node that receives the transmission stop message 1206 obtains the hash value (plaintext) 1205 of the general data to be subjected to the transmission stoppage by decoding the encrypted hash value 1206a using the public key 1203 of the management node NA (the transmission source node of the transmission stop message 1206). When general data having an identical hash value to the hash value 1205 included in the transmission stop message exist among previously received general data, the management node NA stops further transmission of those general data. Note that the node that receives the transmission stop message 1206 relays the message so that the transmission stoppage can be realized likewise in the other nodes.

Here, a case in which the general data to be subjected to the transmission stoppage are received first was described as an example, but transmission of the general data can be suppressed in a similar manner to the first embodiment likewise in a case where the transmission stop message is received first and the general data to be subjected to the transmission stoppage are received thereafter.

According to this method, the management node is capable of stopping transmission through the system of any general data received thereby. As a result, an amount of communication in the system can be managed.

Note that the management node according to this embodiment differs from the other nodes in that it holds both a public key and a private key and has the right to stop transmission of general data. All other functions thereof, however, may be identical to the other nodes. In other words, the management node does not have to be a node that manages the vehicle network in a centralized manner. To ensure that the management node has the right to stop transmission, the ID of the management node may be stored separately in each communication node in the system. Alternatively, the public key (digital certificate) distributed by the management node may be a public key of a certification authority that issues digital certificates only to communication nodes having the right to stop transmission.

The hardware configuration and the functional configuration of the in-vehicle terminal are basically identical to the first embodiment, and therefore differences will mainly be described here.

In this embodiment, a public key does not have to be included in the general data, and therefore processing relating to the public key is omitted from the general data generation processing performed by the transmission data generation unit 409. Further, the field relating to the public key is omitted from the general data packet.

The management node must perform processing to determine the general data to be subjected to the transmission stoppage through the system. This determination may be performed using any method, and in the present invention, there are no particular limitations thereon. For example, data transmission amounts of the respective communication nodes may be compared, and transmission from the node having the largest transmission amount may be stopped. Alternatively, transmission of general data having an earlier generation time/date than a predetermined time/date may be stopped. After determining the general data to be subjected to the transmission stoppage, the management node has the transmission stop message generation unit 410 generate and transmit a transmission stop message for stopping transmission of the general data.

Any method may be employed to distribute the public key of the management node to the other nodes. For example, the management node may transmit its own public key to the peripheral nodes repeatedly, or the public key of the management node may be stored in every in-vehicle terminal in advance (at the time of product shipping, for example). Further, the reception node may obtain the public key of the management node using a repository, as in a PKI.

All other configurations are basically identical to the first embodiment.

According to this embodiment, transmission of general data through the system can be stopped by the management node at a desired timing.

Modified Examples

The embodiments of the present invention described above are merely examples, and the present invention is not to be interpreted as being limited to the above embodiments. Various amendments may be implemented within the scope of the technical spirit of the present invention.

For example, various amendments may be implemented on the methods of distributing the public key according to the respective embodiments. In the first and second embodiments, for example, the public key is included in the general data and transmitted together therewith, but the public key does not have to be included in the general data, and as long as the public key of the generation source node of the transmission stop message is transmitted to each node within the system, a method, a timing, and so on may be selected as desired. For example, the generation source node of the transmission stop message may distribute its own public key repeatedly. Further, the respective nodes in the system may obtain the public as required from a repository of a PKI. Alternatively, the public key may be included in the transmission stop message and transmitted together therewith. As long as a mechanism for guaranteeing the validity of the public key is introduced, when a node that does not have the right to stop transmission transmits a transmission stop message, it is possible to determine on the reception node side that the public key itself or the encrypted hash value is invalid. As a result, a malicious node cannot transmit data with the intention of attacking the system.

Further, as long as repeated transmission of the general data for which a transmission stoppage has been requested in the transmission stop message is stopped, specific processing methods and processing timings may be set as desired. In the above description, decoding of the encrypted hash value and deletion of general data having an identical hash value are implemented upon reception of the transmission stop message, but instead, for example, this processing may be implemented during the data selection processing performed by the general data selection unit 408. The hash value of the received general data is likewise calculated upon reception, but this processing may also be performed during the data selection processing. Furthermore, in the description of the above embodiments, the general data to be subjected to the transmission stoppage are not transmitted even once more when the transmission stop message is received. As long as repeated transmission is eventually stopped, however, one or a plurality of further transmissions may be performed. Accordingly, the processing for decoding the encrypted hash value and the processing for deleting the data to be stopped, for example, may be implemented at timings unrelated to reception and transmission.

Further, the number of nodes having the right to stop data transmission in the system may be set as desired. In the first and second embodiments, for example, not all of the nodes need have the right to stop transmission, and a configuration in which only a part of the nodes have this right, or in other words include the public key, the transmission data generation unit, and so on, may be employed instead. Moreover, in the third embodiment, the number of management nodes in the system may be one or a part of the whole. Alternatively, all of the nodes may be capable of functioning as the management node.

The first to third embodiments may be combined as desired. For example, the first and second embodiments may be combined such that the public keys of the transmission source node and the destination node of the data are included in the general data packet. The transmission source node and the destination node may then generate and transmit the transmission stop message at a desired timing. It is assumed that persons skilled in the art could also arrive easily at a method of combining the third embodiment with the first and second embodiments.

A vehicle-to-vehicle wireless communication system constituted by in-vehicle terminals was described above as an example, but the specific configuration of the communication system is not limited thereto, and the present invention may be applied to a system constituted by any desired mobile wireless communication devices other than vehicles, for example. The mobile wireless communication device may be a wireless communication device provided in a vehicle, a ship, an aircraft, or the like, a wireless communication device that can be carried by a user, such as a laptop computer, a tablet computer, or a portable telephone, and so on. The communication device does not actually have to be mobile, and the present invention may also be applied to a system (a sensor network or the like) constituted by fixed wireless communication devices. Moreover, wireless communication is not a necessity, and the present invention may also be applied to a system that uses wired communication alongside wireless communication or a system that uses only wired communication.

REFERENCE SIGNS LIST

1 Vehicle
10 In-vehicle terminal
402 General data processing unit
403 Public key processing unit
404 Transmission stop message processing unit
405 General data storage unit
406 Public key storage unit
407 Transmission stop message storage unit
408 General data selection unit
409 Transmission data generation unit
410 Transmission stop message generation unit
411 Transmission data selection unit
413 Cryptographic processing unit

The invention claimed is:

1. A communication method for a data sharing system which is constituted by a plurality of communication nodes and through which data transmitted from a transmission source node are propagated by having the respective communication nodes repeatedly transmit the data, the communication method comprising:

repeatedly transmitting, by a second communication node, data transmitted from a transmission source node;

transmitting, by a first communication node, a transmission stop message including a hash value of data in relation to which repeated transmission is to be stopped, wherein when the transmission stop message is transmitted by the first communication node, the first communication node encrypts the hash value of the data in relation to which repeated transmission is to be stopped using a private key of the first communication node, and transmits the transmission stop message after including the encrypted hash value therein;

receiving, by the second communication node, the transmission stop message;

stopping, by the second communication node, repeated transmission of data having an identical hash value to the hash value included in the received transmission stop message, and when the second communication node stops the repeated transmission of the data, the second communication node obtains the hash value of the data in relation to which repeated transmission is to be stopped by decoding the encrypted hash value included in the transmission stop message using a public key of the first communication node.

2. The communication method according to claim 1, wherein the second communication node repeatedly transmits the transmission stop message received when the second communication node is receiving the transmission stop message.

3. The communication method according to claim 1, wherein the second communication node stores data transmitted from another communication node as data to be transmitted repeatedly, and the second communication node excludes data having an identical hash value to the hash value included in the transmission stop message from the data to be transmitted repeatedly when the second communication node stops the repeated transmission of the data.

4. The communication method according to claim 1, wherein when the second communication node receives data transmitted from another communication node and a hash value of the data is not identical to a hash value included in a received transmission stop message, the second communication node stores the data as data to be transmitted repeatedly.

5. The communication method according to claim 1, wherein the first communication node is the transmission source node, and when the data are to be transmitted, the first communication node transmits the data after including the public key of the first communication node therein.

6. The communication method according to claim 1, wherein the first communication node is a destination node of the data, and when the data are to be transmitted, the transmission source node transmits the data after including the public key of the first communication node therein.

7. The communication method according to claim 6, wherein the first communication node, upon receiving the data transmitted from the transmission source node and destined for the first communication node, transmits a transmission stop message requesting that repeated transmission of the data be stopped.

8. The communication method according to claim 1, wherein the first communication node is a management node having a right to request stoppage of repeated transmission, and the public key of the first communication node is distributed to another communication node in advance.

9. A data sharing system comprising: a plurality of communication nodes each including:

a transmitter configured to transmit data, a receiver configured to receive data from a different communication node, and a memory storing the data received by the receiver, and the data stored in the memory being transmitted repeatedly by the transmitter, and a processor operatively coupled to the memory, wherein:
the processor of a first communication node out of the plurality of communication nodes is programmed to transmit a transmission stop message including a hash value of data in relation to which repeated transmission is to be stopped, wherein the processor is further configured to encrypt the hash value of the data in relation to which repeated transmission is to be stopped using a private key of the first communication node, and to transmit the transmission stop message after including the encrypted hash value therein;

the processor of a second communication node out of the plurality of communication nodes, other than the first communication node, is programmed to stop transmission of data having an identical hash value to the hash value included in the transmission stop message upon reception of the transmission stop message, wherein the second communication node is repeatedly transmitting data from a transmission source node; and the second communication node is configured to obtain the hash value of the data in relation to which repeated transmission is to be stopped by decoding the encrypted hash value included in the transmission stop message using a public key of the first communication node.

10. The data sharing system according to claim 9, wherein the transmitter of the second communication node is further configured to repeatedly transmit the transmission stop message to the other communication node.

11. The data sharing system according to claim 9, wherein the second communication node is configured to store data received by the receiver from another communication node as data to be transmitted repeatedly, and the processor is further configured to exclude data having an identical hash value to the hash value included in the transmission stop message from the data to be transmitted repeatedly.

12. The data sharing system according to claim 9, wherein when data received by the receiver from another communication node is received and a hash value of the data is not identical to a hash value included in a received transmission stop message, the processor stores the data in the memory as data to be transmitted repeatedly.

13. The data sharing system according to claim 9, wherein the first communication node is a transmission source node of the data, and when the data are to be transmitted, the first communication node transmits the data after including the public key of the first communication node therein.

14. The data sharing system according to claim 9, wherein the first communication node is a destination node of the data, and when the data are to be transmitted, the transmission source node of the data transmits the data after including the public key of the first communication node therein.

15. The data sharing system according to claim 14, wherein the first communication node, upon receiving the data transmitted from the transmission source node and destined for the first communication node, transmits a transmission stop message requesting that repeated transmission of the data be stopped.

16. The data sharing system according to claim 9, wherein the first communication node is a management node having a right to request stoppage of repeated transmission, and the public key of the first communication node is distributed to the other communication node in advance.

17. A communication node forming a data sharing system which is constituted by a plurality of communication nodes and through which data transmitted from a transmission source node are propagated by having the respective communication nodes repeatedly transmit the data, the communication node comprising:

a transmitter configured to transmit data;

a receiver configured to receive data from another communication node; a memory storing the data received by the receiver, the data stored in the memory being transmitted repeatedly by the transmitter; and a processor operatively coupled to the memory, the processor being programmed to transmit a transmission stop message that includes a hash value of data in relation to which repeated transmission through the data sharing system is to be stopped, wherein the processor is further configured to encrypt the hash value of the data in relation to which repeated transmission is to be stopped using a private key of a host node, and to transmit the transmission stop message after including the encrypted hash value therein, and the another communication node is repeatedly transmitting data from a transmission source node.

18. A communication node forming a data sharing system which is constituted by a plurality of communication nodes and through which data transmitted from a transmission source node are propagated by having the respective communication nodes repeatedly transmit the data, the communication node comprising:

a transmitter configured to transmit data;

a receiver configured to receive data from another communication node;

a memory storing the data received by the receiver, the data stored in the memory being transmitted repeatedly by the transmitter; and a processor operatively coupled to the memory, the processor being programmed to:

receive, from another communication node, a transmission stop message that includes a hash value of data in relation to which repeated transmission through the data sharing system is to be stopped; wherein when the transmission stop message is transmitted by the first communication node, the first communication node encrypts the hash value of the data in relation to which repeated transmission is to be stopped using a private key of the first communication node, and transmits the transmission stop message after including the encrypted hash value therein;

stop transmission of data having an identical hash value to the hash value included in the received transmission stop message, wherein the another communication node is repeatedly transmitting data from a transmission source node, and when the second communication node stops the repeated transmission of the data, the second communication node obtains the hash value of the data in relation to which repeated transmission is to be stopped by decoding the encrypted hash value included in the transmission stop message using a public key of the first communication node.

19. The communication node according to claim 18, wherein the processor is further programmed to exclude data having an identical hash value to the hash value included in the transmission stop message from the data to be transmitted repeatedly.

20. The communication node according to claim 18, wherein when data from another communication node are received by the receiver and a hash value of the data is not identical to a hash value included in a received transmission stop message, the processor stores the data in the memory as data to be transmitted repeatedly.

21. A non-transitory computer readable medium storing a computer program for causing a computer to execute the respective steps of the communication method according to claim 1.

* * * * *